United States Patent
Mao

(10) Patent No.: US 10,823,321 B2
(45) Date of Patent: Nov. 3, 2020

(54) TUBE QUICK-RELEASE ASSEMBLY

(71) Applicant: Harda (Xiamen) Plastic Co., Ltd., Xiamen (CN)

(72) Inventor: Lianhua Mao, Xiamen (CN)

(73) Assignee: Harda (Xiamen) Plastic Co., Ltd., Xiamen (CN)

(*) Notice: Subject to any disclaimer, the term of this patent is extended or adjusted under 35 U.S.C. 154(b) by 588 days.

(21) Appl. No.: 15/654,686

(22) Filed: Jul. 19, 2017

(65) Prior Publication Data

US 2019/0024834 A1 Jan. 24, 2019

(51) Int. Cl.
| | |
|---|---|
| *F16L 37/252* | (2006.01) |
| *F16L 21/04* | (2006.01) |
| *F16L 37/12* | (2006.01) |
| *F16L 37/48* | (2006.01) |
| *F16L 37/098* | (2006.01) |
| *F16L 37/133* | (2006.01) |
| *F16L 17/025* | (2006.01) |
| *F16B 7/04* | (2006.01) |

(52) U.S. Cl.
CPC .......... *F16L 37/252* (2013.01); *F16L 21/045* (2013.01); *F16L 37/0985* (2013.01); *F16L 37/121* (2013.01); *F16L 37/133* (2013.01); *F16L 37/48* (2013.01); *F16B 7/042* (2013.01); *F16L 17/025* (2013.01)

(58) Field of Classification Search
CPC ..... F16L 37/252; F16L 21/045; F16L 37/121; F16L 37/48; F16L 37/0985; F16L 37/133
See application file for complete search history.

(56) References Cited

U.S. PATENT DOCUMENTS

| | | | | |
|---|---|---|---|---|
| 4,809,910 A | * | 3/1989 | Meyer | B05B 15/00 137/15.01 |
| 5,026,024 A | * | 6/1991 | Ito | F16L 37/252 251/149.5 |
| 5,609,370 A | * | 3/1997 | Szabo | F16L 37/0985 285/319 |
| 2010/0230961 A1 | * | 9/2010 | Johnson | F16L 37/252 285/352 |

FOREIGN PATENT DOCUMENTS

| | | | | | |
|---|---|---|---|---|---|
| CN | 102900906 A | * | 1/2013 | | F16L 37/0985 |
| DE | 102008014255 B3 | * | 1/2009 | | F16L 37/0985 |
| EP | 0670449 A1 | * | 9/1995 | | F16L 37/0985 |

* cited by examiner

*Primary Examiner* — Matthew Troutman
*Assistant Examiner* — Fannie C Kee
(74) *Attorney, Agent, or Firm* — Leong C. Lei

(57) ABSTRACT

A tube quick-release assembly includes an outer socket and an inner plug. The inner plug is movably inserted in the outer socket. An upper portion of the outer socket is formed with two opposing engaging openings. An engaging buckle is fitted on the inner plug. The engaging buckle is provided with two opposing engaging legs having hooks and flaring outward. The hooks of the engaging buckle radially engage with the two engaging openings of the outer socket to realize a quick connection of tubes. The two hooks of the engaging buckle can be pressed inward to realize a quick disconnection of tubes.

6 Claims, 8 Drawing Sheets

TUBE QUICK-RELEASE ASSEMBLY

BACKGROUND OF THE INVENTION

Field of the Invention

The present invention relates to a tube connecting member, and more particularly, to a connecting member used for a quick connection and disconnection of two pipelines in a manual manner.

Description of the Prior Art

In order to manually connect the two pipes quickly, a variety of tube connectors are provided. However, the existing tube connectors only provide the function of a quick connection or a quick disconnection, without a directional quick operation for the connection and disconnection. Some of the tube connectors may be displaced when the fluid pressure in the pipeline changes. This affects the service life of the tube connectors.

In order to solve these problems, various tube connectors are developed, such as, Chinese Patent Application No. CN1029000906A entitled "tube quick-release connector". The tube quick-release connector includes an outer socket and an inner plug. The inner plug is movably inserted in the outer socket and sealedly connected to the outer socket through a sealing member. The tube quick-release connector further includes a sleeve. The inner plug is inserted through the sleeve. The sleeve is movably fitted in the outer socket. An annular boss is provided on the outer peripheral wall of the front portion of the inner plug. The side wall of the outer socket is formed with at least two suspended arms. The suspended arms are reduced inward from the top to the bottom toward the outer socket. The inner diameter surrounded by the lower ends of the suspended arms is smaller than the outer diameter of the annular boss of the inner plug. The side wall of the outer socket is formed with an opening at the lower ends of the suspended arms. The distance between the lower end of the opening and the lower end faces of the suspended arms is slightly greater than the height of the annular boss. The upper portion of the sleeve extends out of the outer socket, and the lower portion of the sleeve is provided with protruding legs corresponding to the suspended arms. The suspended arms radially engage with the annular boss of the inner plug to achieve a quick connection of the pipelines. When the fluid pressure in the pipeline changes, the annular boss applies a force to the lower end faces of the suspended arms. Because the suspended arms don't have a space for an inward deformation, the suspended arms apply a stable counterforce to the annular boss to prevent the inner plug from displacing in the outer socket. The sleeve is moved axially along the outer socket, and the protruding legs of the sleeve press the suspended arms of the outer socket to expand outwardly and no longer engage with the annular boss of the inner plug, thereby realizing a quick disassembly of the tubes.

However, the above-mentioned tube quick-release connector has the following disadvantages. In order to connect the sleeve with the outer socket when in use, the sleeve is provided with at least protruding legs having hooks, and the side wall of the outer socket is provided with corresponding engaging holes and guide grooves, and the outer socket is provided with guide notches corresponding to the protruding legs of the sleeve. Therefore, the outer socket needs an engaging mechanism for a connection of the inner plug and another engaging mechanism for a connection of the sleeve, resulting in the difficulty in making the outer socket, great complexity of the mold, and high production costs. Accordingly, the present invention intends to provide a dual faucet structure for improving the shortcomings mentioned above.

SUMMARY OF THE INVENTION

The primary object of the present invention is to provide a tube quick-release assembly which can be connected and disconnected quickly and has a simple structure.

In order to achieve the aforesaid object, the tube quick-release assembly of the present invention comprises an outer socket and an inner plug. The inner plug is movably inserted in a stepped inner hole of the outer socket. The stepped inner hole is reduced downward. An insertion section at a lower portion of the inner plug is sealedly connected to a small end of the stepped hole of the outer socket through a sealing ring. An outer peripheral wall of the lower portion of the inner plug is formed with a first annular boss. The first annular boss is configured to restrict a depth that the insertion section of the lower portion of the inner plug is inserted into the small end of the stepped inner hole of the outer socket. An upper portion of the inner plug is a thin tube having a smaller outer diameter. A root portion of the thin tube is provided with a second annular boss. An upper portion of the outer socket is formed with two opposing engaging openings in communication with a large end of the stepped inner hole of the outer socket. An engaging buckle is fitted on the thin tube of the inner plug. The engaging buckle is provided with two opposing engaging legs having hooks and flaring outward. The hooks of the two engaging legs pass over the second annular boss of the inner plug and extend into the large end of the stepped inner hole of the outer socket to engage with the engaging openings, respectively.

The engaging buckle presses the inner plug in the outer socket, and the two hooks of the engaging buckle radially snap the two engaging openings of the outer socket to achieve a quick connection of fittings. When the fluid pressure in the pipeline changes, the second annular boss of the inner plug applies a force to the engaging buckle to push the engaging buckle upward, and the two hooks of the engaging buckle are not subjected to the inward external force so that the two hooks won't disengage from the engaging openings of the outer socket. The outer socket pulls the engaging buckle, and the engaging buckle applies a stable counterforce to the second annular boss of the inner plug, thereby preventing the inner plug from moving in the outer socket. When the two hooks of the engaging buckle are pressed inward to disengage from the engaging openings of the outer socket, the inner plug is separated from the outer socket to achieve a quick disconnection of the fittings. Since the structure of the engaging buckle doesn't have two raised legs compared to the sleeve in the prior art and the structure of the outer socket doesn't have two suspended arms and openings compared to the outer socket in the prior art, the structures of the engaging buckle and the outer socket are simpler. The corresponding molds are also very simple, greatly reducing the manufacturing costs. Although the structure of the inner plug is provided with the second annular boss compared to the inner plug in the prior art, there is no essential difference for the molds, and the additional cost is extremely low. Thus, the present invention achieves a bidirectional quick operation for connection and disconnection and has a simple structure.

Preferably, an upper end of the engaging buckle is a C-shaped ring, and upper ends of two engaging legs are located at two sides of an opening of the C-shaped ring, respectively. In this way, the engaging buckle does not have to be preset on the thin tube of the inner plug. The C-shaped ring having an expandable characteristic can be installed on the thin tube of the inner plug anytime, thereby simplifying the operation of assembly.

Preferably, an outer peripheral surface of the upper portion of the outer socket is provided with axial ribs corresponding to the two engaging openings. An inner wall of the large end of the stepped inner hole of the outer socket is formed with axial guide grooves corresponding in position to the ribs and communicating with the engaging openings. The hooks of the two engaging legs of the engaging buckle are inserted along the corresponding guide grooves of the outer socket to engage with lower ends of the corresponding ribs, respectively.

The guide grooves at the inner sides of the two ribs function as passages for the two hooks of the engaging buckle to move up and down, reducing the degree of inward deformation of the two engaging legs to prolong the service life of the engaging buckle. On the other hand, the thickness of the upper portion of the outer socket can be reduced to save the raw materials of injection molding, and the uniformity of the thickness of the upper portion of the outer socket can be taken into account. This is beneficial for the product yield of injection molding.

Preferably, a lower portion of the outer socket is formed with a connecting tube, and an outer wall of the connecting tube is formed with an engaging edge to engage with a matching tube.

Alternatively, a lower portion of the outer socket is formed with a sleeve having inner threads to be threadedly connected with a matching component.

Preferably, lower ends of the hooks of the two engaging legs of the engaging buckle extend downward to form press portions.

The press portion are provided to facilitate the user to press the lower ends of the two engaging legs of the engaging buckle in the radial direction, such that the two hooks are not engaged with the lower ends of the corresponding ribs of the outer socket to improve the speed of the disassembly.

Preferably, the hooks of the two engaging legs of the engaging buckle and the lower ends of the ribs of the outer socket are each designed in the form of an acute angle reduced inward and downward to mate with each other. This structure can prevent the two hooks of the engaging buckle from being erroneously operated to disengage from the lower ends of the corresponding ribs of the outer socket when the two press portions of the engaging buckle are slightly touched by accident.

The tube quick-release assembly of the present invention simplifies the structure of the outer socket, and simplifies the structure and installation of the sleeve to form the engaging buckle, and change the structure of the inner plug appropriately to realize a bidirectional quick operation of connection and disconnection and to reduce the difficulty of making molds and to reduce the cost of production. When the conventional quick-release connector is disassembled, the operator pushes the sleeve to move axially along the outer socket with one hand and holds the outer socket with the other hand Another person pulls the inner plug reversely along the outer socket to separate the inner plug from the outer socket. When the tube quick-release assembly of the present invention is disassembled, the operator simply presses the two hooks (or the press portions) of the engaging buckle inward with two fingers of one hand inwardly to disengage the two hooks from the corresponding engaging openings (or the lower ends of the ribs) of the outer socket, and then the engaging buckle is axially moved upward relative to the inner tube of the inner plug. After that, the outer socket is held with one hand, and the inner plug is pulled upward with the other hand. A person can separate the inner plug from the outer socket. Therefore, the disassembly of the tube quick-release assembly of the present invention is more convenient for operation.

DETAILED DESCRIPTION OF THE PREFERRED EMBODIMENTS

Embodiments of the present invention will now be described, by way of example only, with reference to the accompanying drawings.

As shown in FIG. 1 to FIG. 9, the present invention discloses a tube quick-release assembly. The tube quick-release assembly comprises an inner plug 1, two sealing rings 2, an engaging buckle 3, and an outer socket 4.

Figure 1:
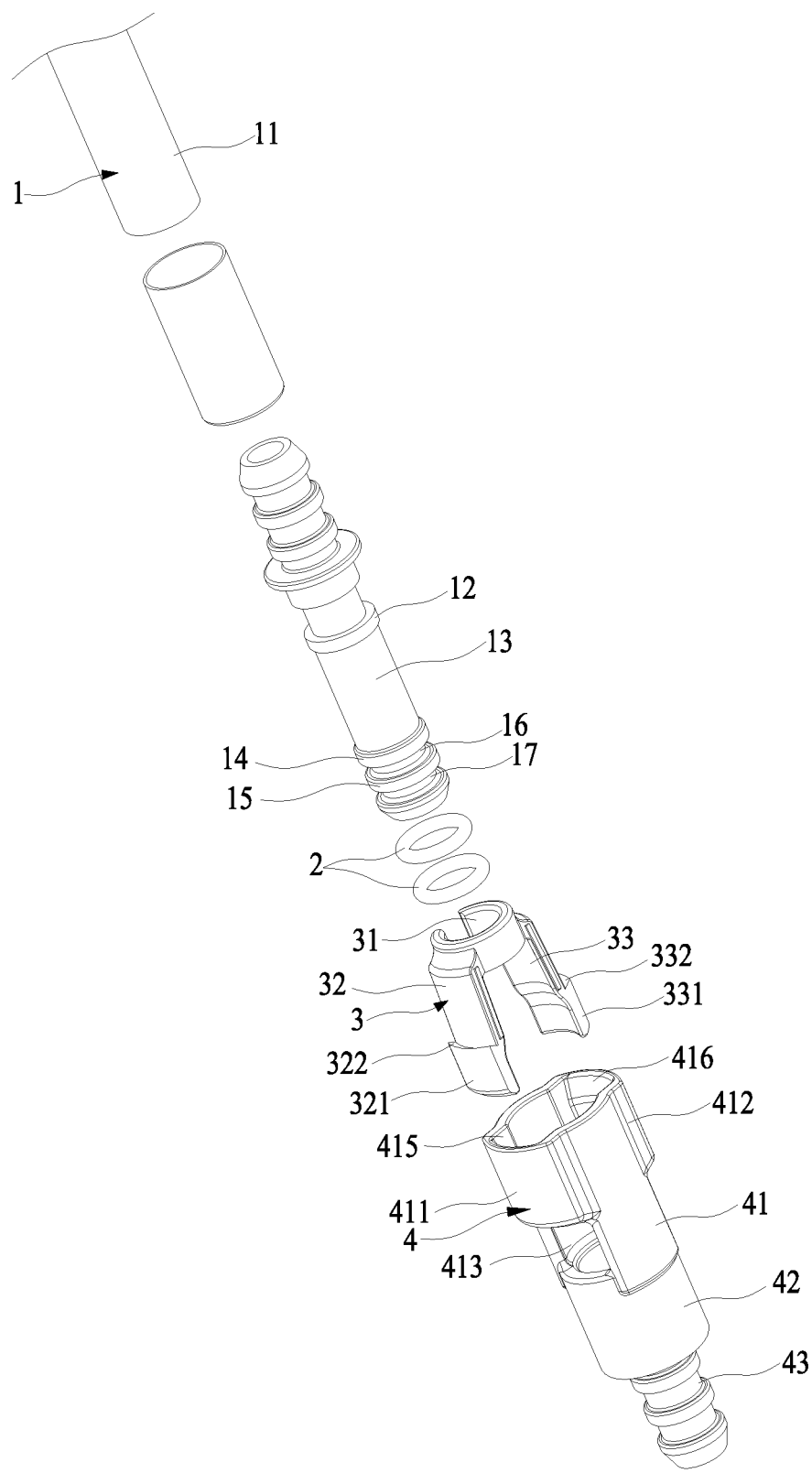
FIG. 1 is an exploded view of the tube quick-release assembly in accordance with an embodiment of the present invention.
Figure 7:
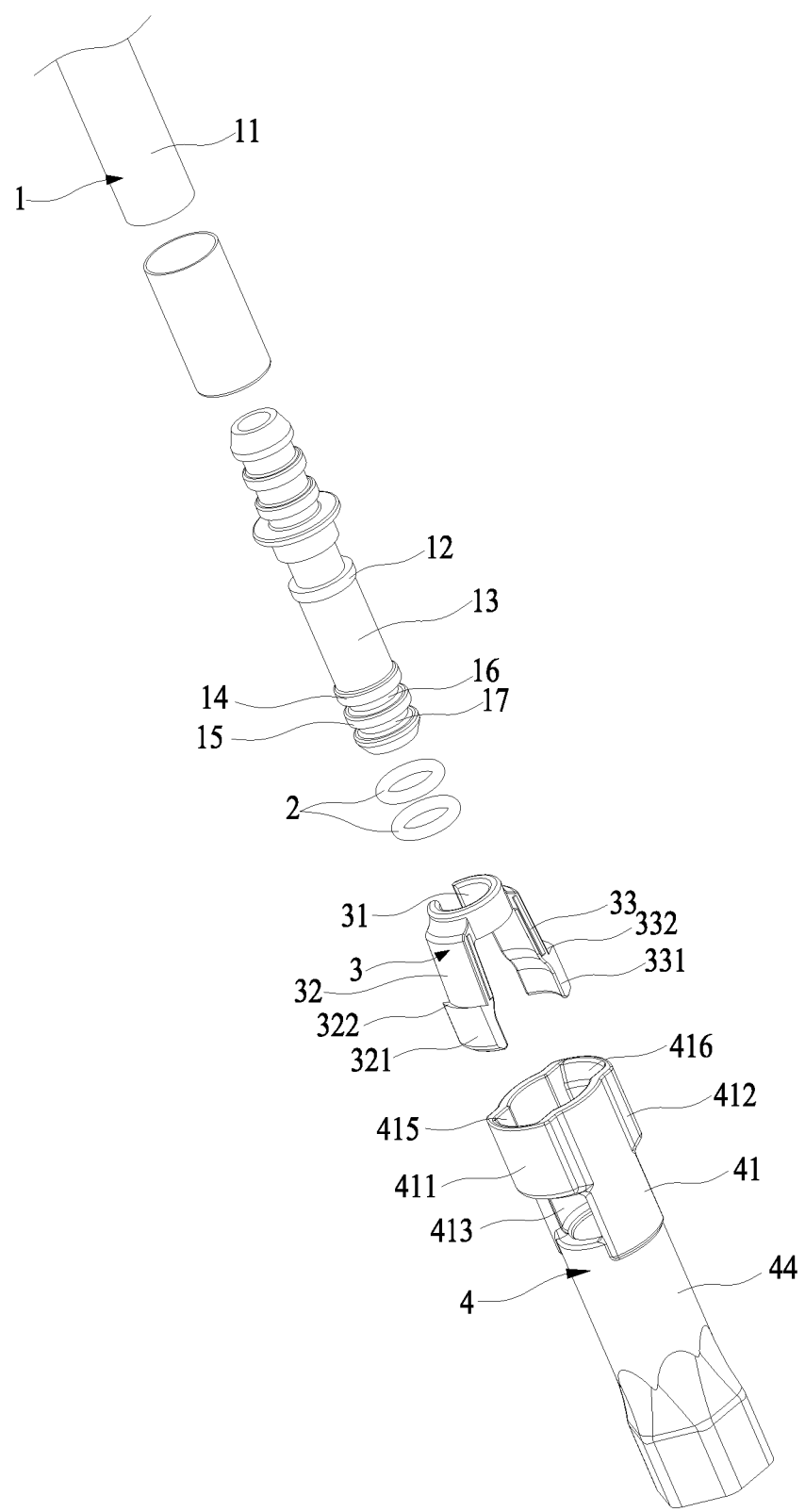
FIG. 7 is an exploded view of the tube quick-release assembly in accordance with another embodiment of the present invention.

As shown in FIG. 1 and FIG. 7, an upper portion of the inner plug 1 is a thin tube 11 having a smaller outer diameter. A root portion of the thin tube 11 is provided with a second annular boss 12. An insertion section 15 at a lower portion of the inner plug 1 is formed with two annular grooves 16, 17. The two annular grooves 16, 17 are fitted with the two sealing rings 2, respectively. An outer peripheral wall of the lower portion of the inner plug 1 is provided with a first annular boss 14 above the insertion section 15. The diameter of a transition section 13 between the first annular boss 14 and the second annular boss 12 is the same as that of the insertion section 15.

An upper end of the engaging buckle 3 is a C-shaped ring 31. Upper ends of two engaging legs 32, 33 are located at two sides of an opening of the C-shaped ring 31, respectively. The left engaging leg 32 flares leftward and has a left hook 322 at a lower end thereof. A lower end of the left hook 322 extends downward to form a left press portion 321. The right engaging leg 33 flares rightward and has a right hook 332 at a lower end thereof. A lower end of the right hook 332 extends downward to form a right press portion 331.

Figure 2:
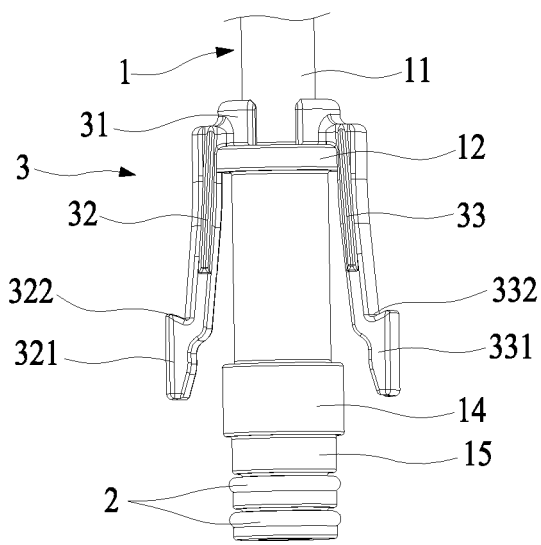
FIG. 2 is a perspective view of the thin tube and the engaging buckle after assembled of the embodiment of FIG. 1.
Figure 3:
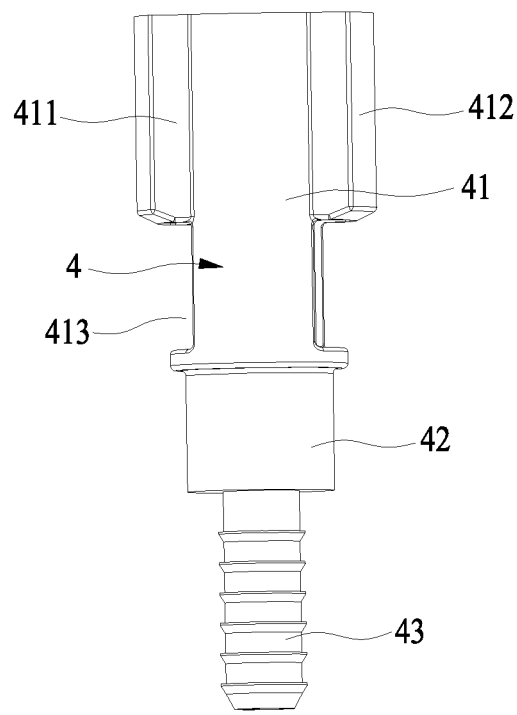
FIG. 3 is a schematic view of the outer socket of the embodiment of FIG. 1.
Figure 4:
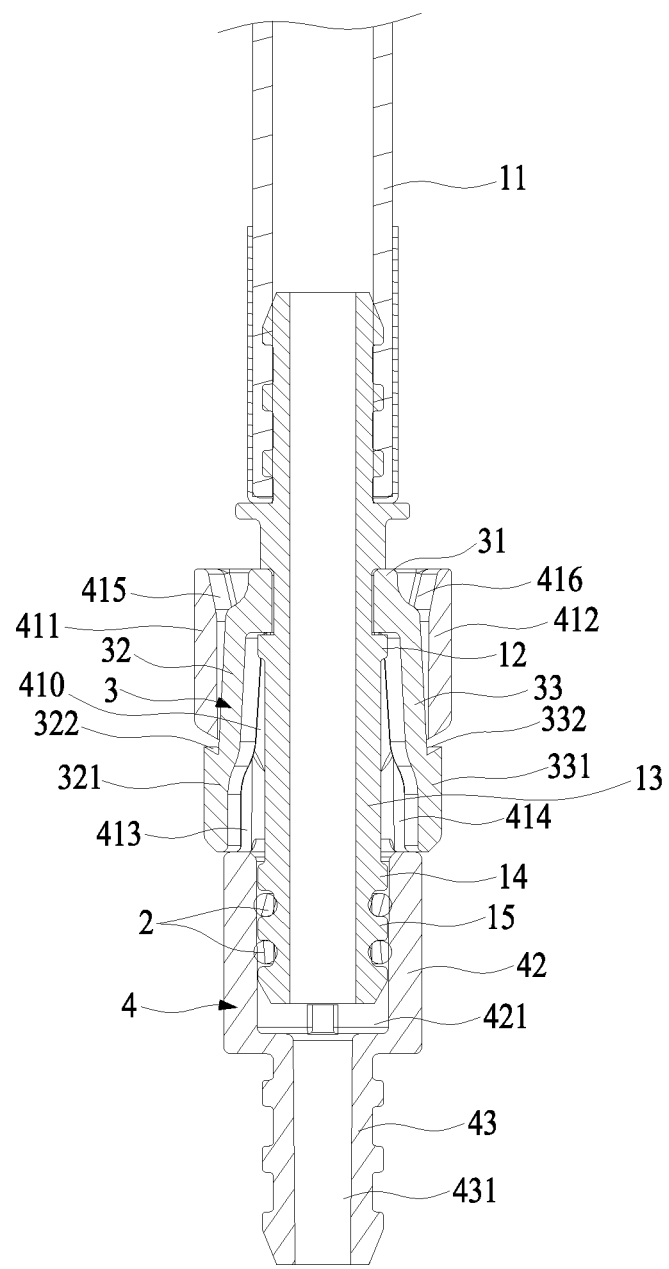
FIG. 4 is a sectional view of the thin tube and the engaging buckle after assembled of the embodiment of FIG. 1.

In an embodiment as shown in FIG. 1 to FIG. 6, an upper portion of the outer socket 4 is an upper circular tube 41 having the largest diameter. A middle portion of the outer socket 4 is a straight cylinder 42 having a diameter slightly smaller than that the upper circular tube 41. A lower portion of the outer socket 4 is a connecting tube 43 having the smallest diameter. An outer wall of the connecting tube 43 is formed with an engaging edge to engage with a matching tube. Referring to FIG. 3 and FIG. 4, the inside of each of the upper circular tube 41 and the straight cylinder 42 is formed with a stepped inner hole. The stepped inner hole is reduced downward. The connecting tube 43 has an inner hole 431 in communication with a small end 421 of the stepped inner hole of the straight cylinder 42. The upper circular tube 41 is formed with two opposing engaging openings 413, 414 which are in communication with a large end 410 of the inner hole of the upper circular tube 41. An outer peripheral surface of the upper circular tube 41 is provided with axial ribs 411, 412 corresponding to the two engaging openings 413, 414. The inner wall of the upper circular tube 41 is formed with an axial left guide groove 415 corresponding in position to the left rib 411 and communicating with the left engaging opening 413. The inner wall of the upper circular tube 41 is formed with an axial right guide groove 416 corresponding in position to the right rib 412 and communicating with the right engaging opening 414.

Figure 8:
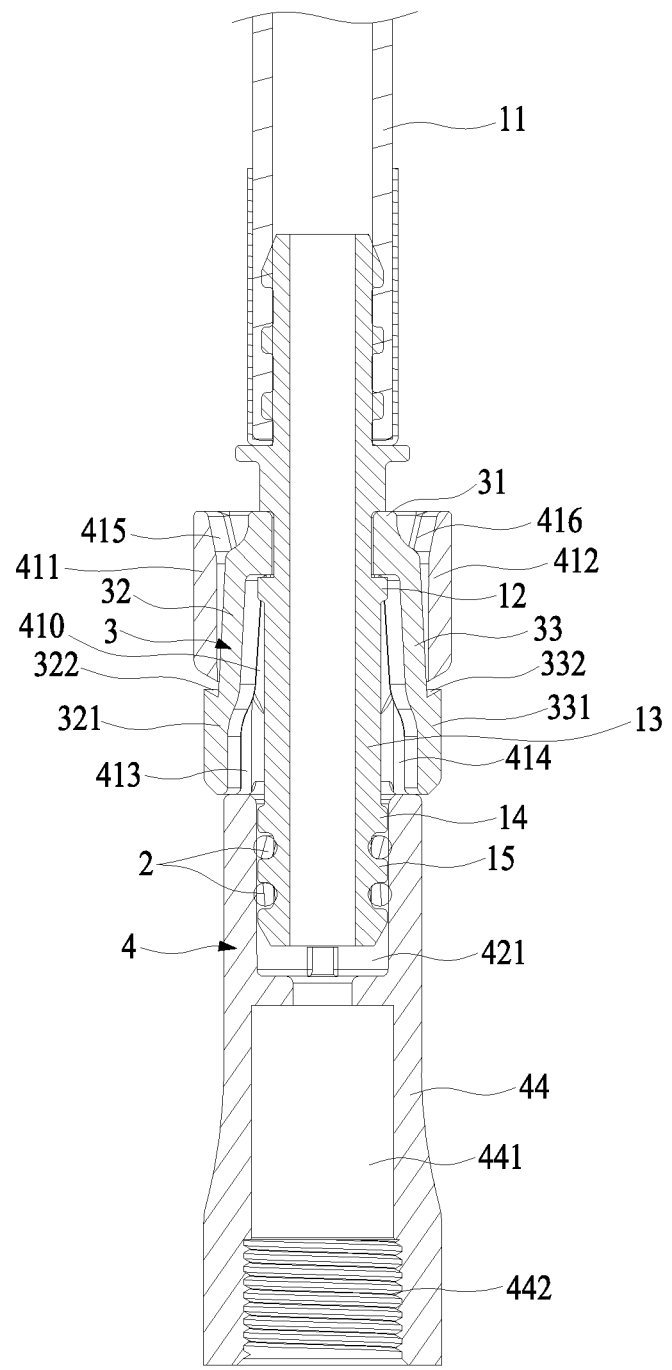
FIG. 8 is a sectional view of the thin tube and the engaging buckle after assembled of the embodiment of FIG. 7.
Figure 9:
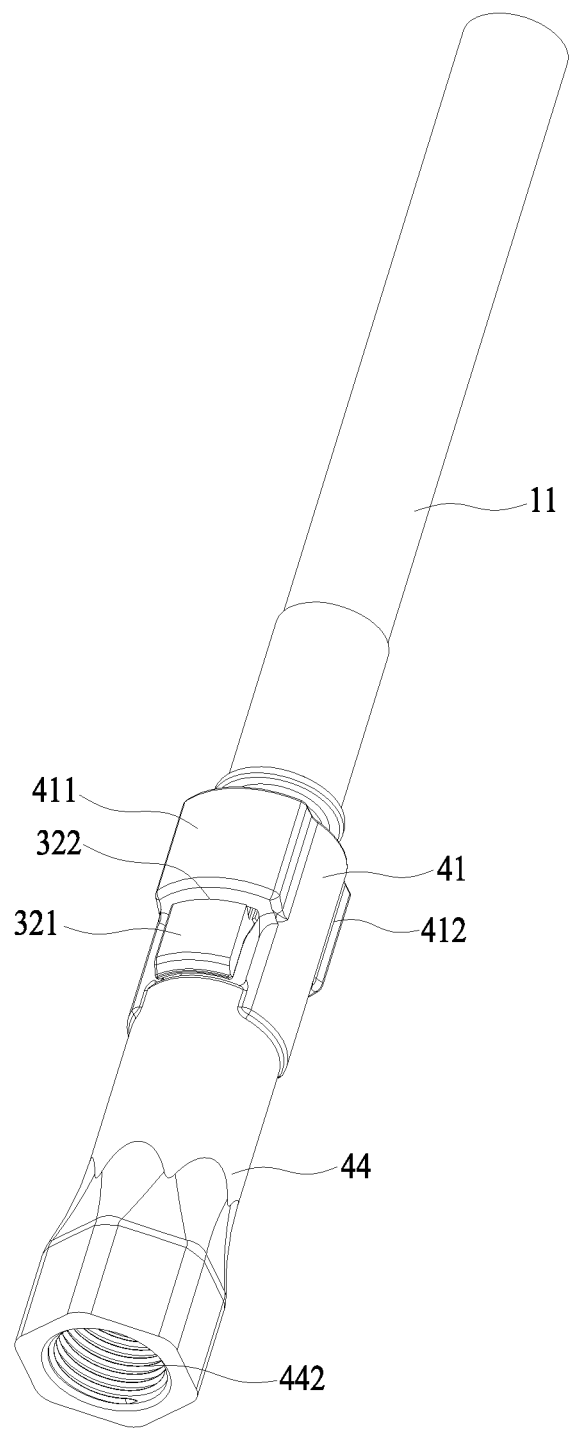
FIG. 9 is a perspective view of the thin tube and the engaging buckle after assembled of the embodiment of FIG. 7.

In another embodiment as shown in FIG. 7 to FIG. 9, an upper portion of the outer socket 4 is an upper circular tube 41 having the largest diameter. The inside of the upper circular tube 41 is formed with a stepped inner hole. The stepped inner hole is reduced downward. A lower portion of the outer socket 4 is a sleeve 44 having a diameter slightly smaller than the upper circular tube 41. The sleeve 44 is configured to be threadedly connected with a matching component. The sleeve 44 has an inner hole 441 in communication with a small end 421 of the stepped inner hole of the upper circular tube 41. A lower portion of the sleeve 44 is formed with inner threads 442. The upper circular tube 41 is formed with two opposing engaging openings 413, 414 which are in communication with a large end 410 of the inner hole of the upper circular tube 41. An outer peripheral surface of the upper circular tube 41 is provided with axial ribs 411, 412 corresponding to the two engaging openings 413, 414. An inner wall of the upper circular tube 41 is formed with an axial left guide groove 415 corresponding in position to the left rib 411 and communicating with the left engaging opening 413. The inner wall of the upper circular tube 41 is formed with an axial right guide groove 416 corresponding in position to the right rib 412 and communicating with the right engaging opening 414.

Referring to FIG. 2, the C-shaped ring 31 of the engaging buckle 3 is fitted on the thin tube 11 of the inner plug 1 and pressed against the second annular boss 12 of the inner plug 1. The two opposing engaging legs 32, 33 flare outward. The left press portion 321 and the right press portion 331 reach to the outer side of the first annular boss 14 of the inner plug 1.

For a quick connection, the inner plug 1 is movably inserted in the stepped inner hole of the outer socket 4, and the insertion section 15 of the lower portion of the inner plug 1 is sealedly connected to the inner hole (the small end 421 of the stepped inner hole) of the straight cylinder 42 of the outer socket 4 through the two sealing rings 2. The first annular boss 14 on the outer peripheral wall of the lower portion of the inner plug 1 restricts a depth that the insertion section 15 of the lower portion of the inner plug 1 is inserted into the inner hole 421 of the straight cylinder 42 of the outer socket 4. The hooks 322, 332 of the two engaging legs 32, 33 of the engaging buckle 3 are inserted along the corresponding guide grooves 415, 416 of the outer socket 4 to engage with lower ends of the corresponding ribs 411, 412, respectively. As shown in FIG. 4, when the fluid pressure in the pipeline changes, the second annular boss 12 of the inner plug 1 applies a force to the C-shaped ring 31 of the engaging buckle 3 to push the C-shaped ring 31 of the engaging buckle 3 upward, and the two hooks 322, 332 of the engaging buckle 3 are not subjected to the inward external force so that the two hooks 322, 332 are not disengaged from the lower ends of the corresponding ribs 411, 412 at the corresponding engaging openings 413, 414 of the outer socket 4. The outer socket 4 pulls the engaging buckle 3, and the engaging buckle 3 applies a stable counterforce to the second annular boss 12 of the inner plug 1, thereby preventing the inner plug 1 from moving in the outer socket 4.

The hooks 322, 332 of the two engaging legs 32, 33 of the engaging buckle 3 and the lower ends of the ribs 411, 412 of the outer socket 4 are each designed in the form of an acute angle reduced inward and downward to mate with each other. This design can prevent the two hooks 322, 332 of the engaging buckle 32 from being erroneously operated to disengage from the lower ends of the corresponding ribs 411, 412 of the outer socket 4 when the two press portions 321, 331 of the engaging buckle 3 are slightly touched by accident to result in unexpected disengagement of the inner plug 1 and the outer socket 4.

Figure 5:
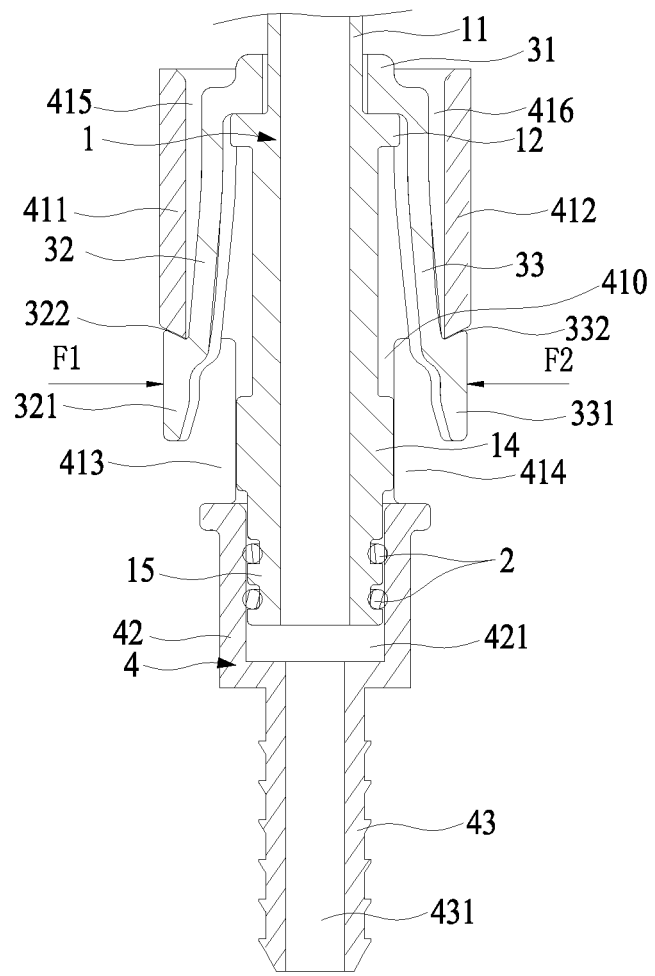
FIG. 5 is a sectional view showing the first step during the disassembly of the embodiment of FIG. 1.
Figure 6:
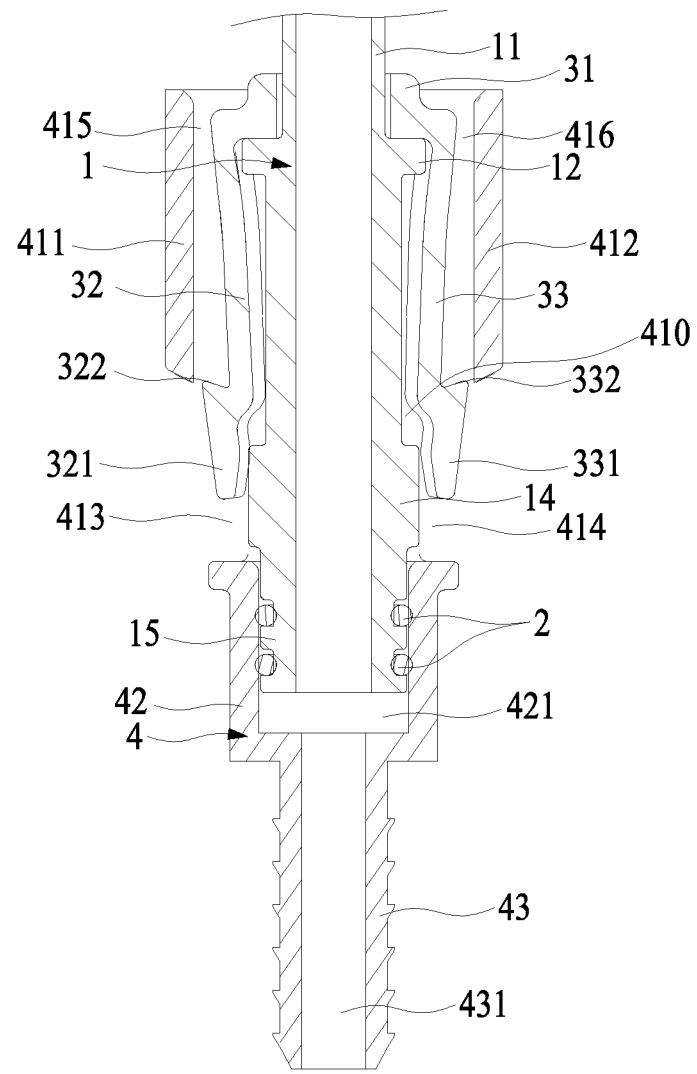
FIG. 6 is a sectional view showing the second step during the disassembly of the embodiment of FIG. 1.

As shown in FIG. 5 and FIG. 6, the operator simply presses the two press portions 321, 331 of the engaging buckle 3 inward, such that the two hooks 322, 332 are disengaged from the lower ends of the ribs 411, 412 corresponding to the engaging openings 413, 414 of the outer socket 4, and then the thin tube 11 of the inner plug 1 is lifted up. The engaging buckle 3 is pushed upward by the second annular boss 12 of the inner plug 1 to move axially upward along with the thin tube 11 of the inner plug 1 relative to the corresponding guide grooves 415, 416 of the outer socket 4. The insertion section 15 of the inner plug 1 is separated from the straight cylinder 42 of the outer socket 4. Finally, the inner plug 1 is completely separated from the outer socket 4.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tube quick-release assembly, comprising an outer socket and an inner plug, the inner plug being movably inserted in a stepped inner hole of the outer socket, the stepped inner hole being reduced downward, an insertion section at a lower portion of the inner plug being sealedly connected to a small end of the stepped hole of the outer socket through a sealing ring;

an outer peripheral wall of the lower portion of the inner plug being formed with a first annular boss, the first annular boss being configured to restrict a depth that the insertion section of the lower portion of the inner plug is inserted into the small end of the stepped inner hole of the outer socket, an upper portion of the inner plug being a thin tube having a smaller outer diameter, a root portion of the thin tube being provided with a second annular boss, an upper portion of the outer socket being formed with two opposing engaging openings in communication with a large end of the stepped inner hole of the outer socket, an engaging buckle being fitted on the thin tube of the inner plug, the engaging buckle being provided with two opposing engaging legs having hooks and flaring outward, the hooks of the two engaging legs passing over the second annular boss of the inner plug and extending into the large end of the stepped inner hole of the outer socket to engage with the engaging openings, respectively, wherein an upper end of the engaging buckle is a C-shaped ring, and upper ends of the two engaging legs are located at two sides of an opening of the C-shaped ring, respectively.

2. The tube quick-release assembly as claimed in claim 1, wherein an outer peripheral surface of the upper portion of the outer socket is provided with axial ribs corresponding to the two engaging openings, an inner wall of the large end of the stepped inner hole of the outer socket is formed with axial guide grooves corresponding in position to the ribs and communicating with the engaging openings; and the hooks of the two engaging legs of the engaging buckle are inserted along the corresponding guide grooves of the outer socket to engage with lower ends of the corresponding ribs, respectively.

3. The tube quick-release assembly as claimed in claim 2, wherein lower ends of the hooks of the two engaging legs of the engaging buckle extend downward to form press portions.

4. The tube quick-release assembly as claimed in claim 3, wherein the hooks of the two engaging legs of the engaging buckle and the lower ends of the ribs of the outer socket are each designed in the form of an acute angle reduced inward and downward to mate with each other.

5. The tube quick-release assembly as claimed in claim 1, wherein a lower portion of the outer socket is formed with a connecting tube, and an outer wall of the connecting tube is formed with an engaging edge to engage with a matching tube.

6. The tube quick-release assembly as claimed in claim 1, wherein a lower portion of the outer socket is formed with a sleeve having inner threads to be threadedly connected with a matching component.

* * * * *